United States Patent
Pinkos et al.

Patent Number: 5,732,791
Date of Patent: Mar. 31, 1998

[54] STEERING APPARATUS

[75] Inventors: Andrew F. Pinkos, Clarkston; Mark W. Gluch, Grosse Ile, both of Mich.

[73] Assignee: TRW Inc., Lyndhurst, Ohio

[21] Appl. No.: 566,118

[22] Filed: Nov. 30, 1995

[51] Int. Cl.$^6$ ........................................ B62D 5/04
[52] U.S. Cl. ................................ 180/444; 180/446
[58] Field of Search .......................... 180/443, 444, 180/445, 446

[56] References Cited

U.S. PATENT DOCUMENTS

| | | | |
|---|---|---|---|
| 2,587,377 | 2/1952 | Penrose | 318/2 |
| 4,241,804 | 12/1980 | Deininger et al. | 180/444 |
| 4,301,739 | 11/1981 | Mehren et al. | 104/247 |
| 4,666,010 | 5/1987 | Morishita et al. | 180/443 |
| 4,741,408 | 5/1988 | Bausch et al. | 180/443 |
| 4,800,974 | 1/1989 | Wand et al. | 180/443 |
| 5,236,335 | 8/1993 | Takeuchi et al. | 180/446 |
| 5,354,488 | 10/1994 | Shtarkman et al. | 252/62.56 |
| 5,367,459 | 11/1994 | Shtarkman et al. | 364/424.046 |

FOREIGN PATENT DOCUMENTS

| | | |
|---|---|---|
| 0317186 | 5/1989 | European Pat. Off. |
| 0566931 | 10/1993 | European Pat. Off. |
| 2242009 | 3/1975 | France |
| 2408501 | 6/1979 | France |
| 2683645 | 5/1993 | France |
| 3922930 | 1/1991 | Germany |

*Primary Examiner*—Kevin Hurley
*Attorney, Agent, or Firm*—Tarolli, Sundheim, Covell, Tummino & Szabo

[57] ABSTRACT

An improved vehicle steering apparatus (10) includes an electric motor (28) which is continuously energized during operation of the vehicle. A pair of clutch assemblies (42 and 44) are connected with a steering shaft (48) which extends from the vehicle steering wheel (12) to steering gear (14) connected with steerable vehicle wheels (16 and 18). A drive assembly (38) continuously transmits force from the motor (28) to the clutch assemblies (42 and 44) during operation of the vehicle. Upon turning of the steering wheel (12), a control unit (56) provides an output to an electromagnet (102) in one of the clutch assemblies (42 or 44) to energize the electromagnet. Energizing the electromagnet (102) increases the resistance of a rheological fluid (98) in the clutch assembly (42 and 44) to shear. As the shear strength of the rheological fluid (98) increases, the force transmitted by the drive assembly (38 to the clutch assemblies (42 or 44) from the continuously operating motor (28) increases to assist in rotating the steering shaft (48) and turning of the steerable vehicle wheels (16 and 18).

15 Claims, 1 Drawing Sheet

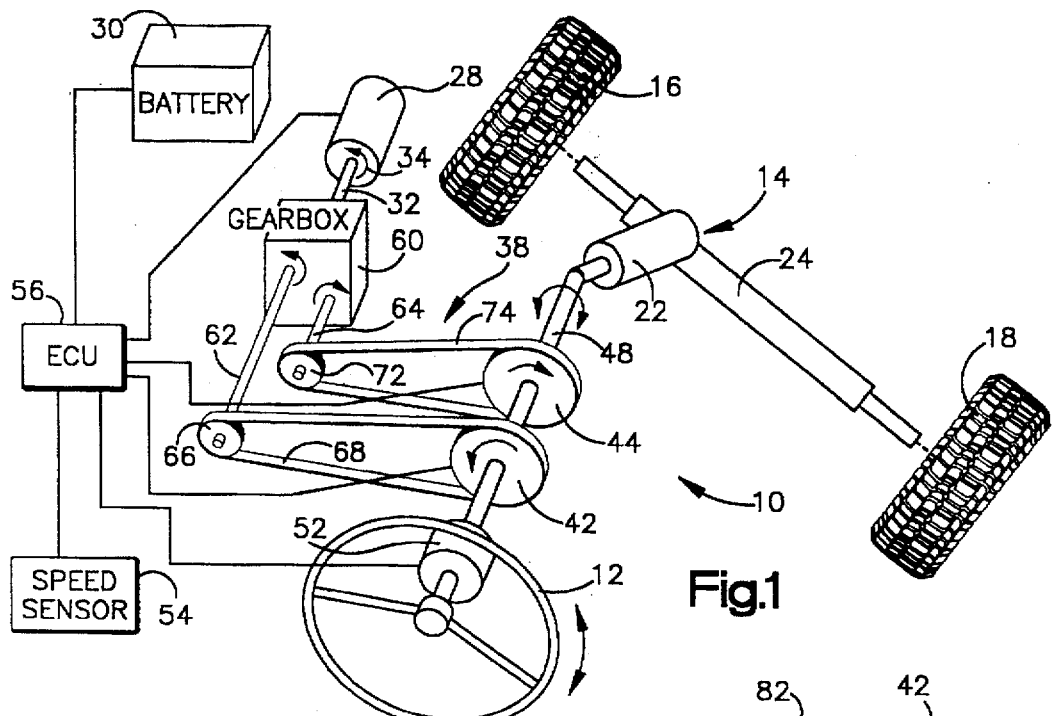
Fig.1
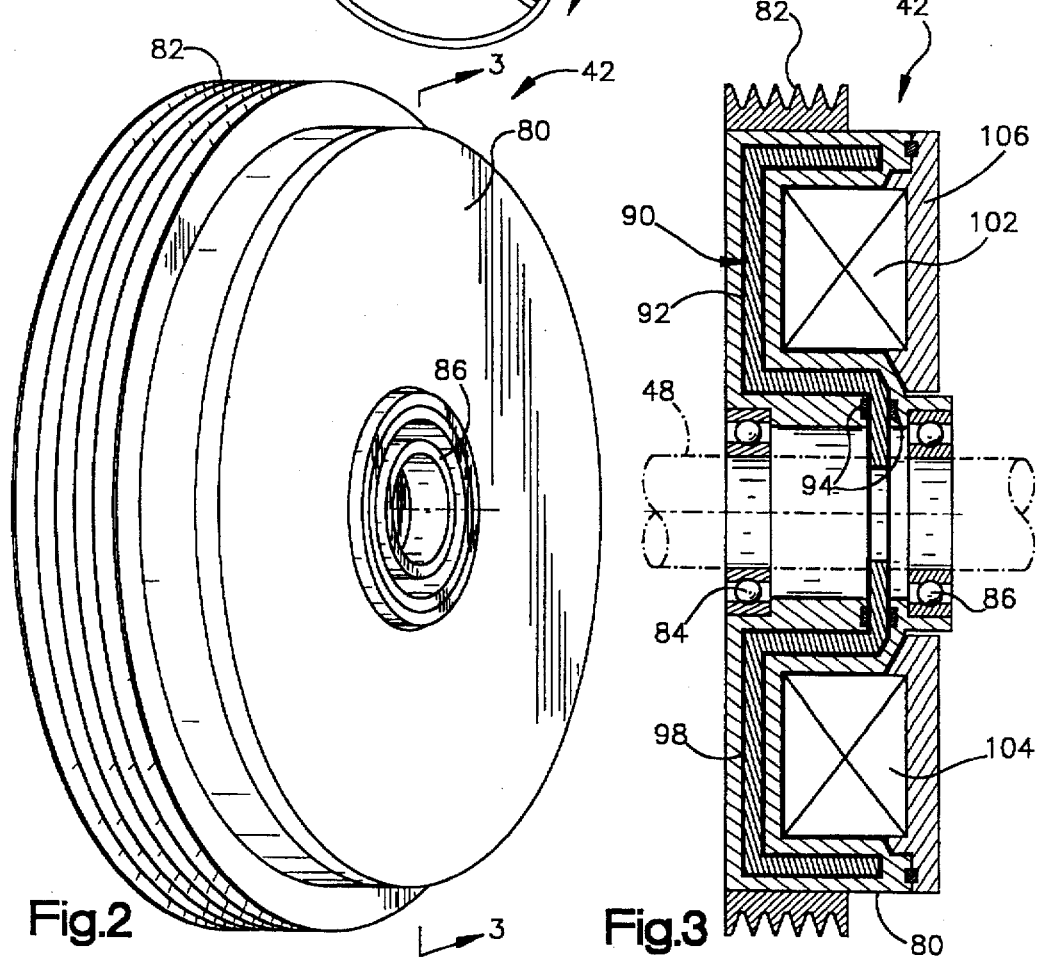
Fig.2
Fig.3

STEERING APPARATUS

BACKGROUND OF THE INVENTION

An improved apparatus is provided to assist in turning steerable vehicle wheels upon rotation of a steering wheel.

A known electric power steering system includes an electric motor which is connected with steerable vehicle wheels through a steering gear assembly. Prior to turning of a steering wheel, the electric motor is de-energized. Upon initiation of turning of the steering wheel in one direction, for example counterclockwise, the electric motor must be energized and accelerated from zero velocity to a maximum operating velocity in a first direction. Upon rotation of the steering wheel in the opposite direction, for example clockwise, the electric motor must be accelerated from zero to a maximum operating velocity in a second direction opposite to the first direction. In addition, the electric motor must provide the correct level of assist torque in the required direction.

SUMMARY OF THE INVENTION

The present invention provides an improved apparatus for use in assisting in turning steerable vehicle wheels in either a first direction or a second direction upon rotation of a vehicle steering wheel. The apparatus includes an electric motor which is continuously energized during operation of the vehicle. A drive assembly is provided to transmit force between the electric motor and a pair of clutch assemblies connected with a rotatable steering member. A control unit is provided to control the amount of force transmitted from the electric motor through the clutch assemblies to the rotatable steering member.

Each of the clutch assemblies includes an input member which is rotated by the drive assembly and an output member which is connected with the rotatable steering member. In one embodiment of the invention, a body of rheological fluid responsive to an energy field is provided between the input and output members in each of the clutch assemblies. In each of the clutch assemblies, a field generator, such as an electromagnet, is energizeable to provide a variable strength energy field which is effective to increase the resistance of the rheological fluid to shear as the strength of the energy field increases.

A torque sensor is advantageously connected with the steering wheel to enable the control unit to increase the strength of the energy field as the torque applied to the steering wheel increases. In order to improve the operating efficiency of the apparatus, a speed sensor may be provided to enable the control unit to decrease the operating speed of the continuously energized electric motor as vehicle speed increases. In addition, the control unit may be operable to decrease the strength of the energy field as vehicle speed increases.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of an apparatus which is used to assist in turning of steerable vehicle wheels;

FIG. 2 is a pictorial illustration of a clutch assembly utilized in the apparatus of FIG. 1; and FIG. 3 is a sectional view, taken generally along the line 3—3 of FIG. 2, further illustrating the construction of the clutch assembly.

DESCRIPTION OF ONE SPECIFIC PREFERRED EMBODIMENT OF THE INVENTION

General Description

A steering assist apparatus 10 is schematically illustrated in FIG. 1. Upon manual rotation of a vehicle steering wheel 12, the apparatus 10 assists a steering gear assembly 14 in turning steerable vehicle wheels 16 and 18. Upon rotation of the steering wheel 12 in a counterclockwise direction, the apparatus 10 assists in turning the steerable vehicle wheels toward the left (as viewed in FIG. 1). Upon rotation of the steering wheel 12 in a clockwise direction, the steering apparatus 10 assists in turning the steerable vehicle wheels 16 and 18 toward the right (as viewed in FIG. 1).

The steering gear assembly 14 is of the well known rack and pinion type. The steering gear assembly 14 includes a pinion gear 22, which has been illustrated schematically in FIG. 1, and a rack bar 24 having gear teeth which mesh with the pinion gear. While the illustrated steering gear assembly 14 is of the well known rack and pinion type, the steering gear assembly could have any one of many different known constructions.

The steering assist apparatus 10 includes an electric motor 28 which is continuously energized by a vehicle battery 30 during operation of the vehicle. During operation of the vehicle, the motor 28 is operated in only one direction. Thus, during operation of the vehicle, an output shaft 32 of the electric motor 28 is continuously rotated in a counterclockwise direction indicated by an arrow 34 in FIG. 1.

A drive assembly 38 is continuously driven by the motor 28 during operation of the vehicle. A first clutch assembly 42 is continuously driven, in a counterclockwise direction (as viewed in FIG. 1) by the drive assembly 38 during operation of the vehicle. Similarly, a second clutch assembly 44 is continuously driven in a clockwise direction by the drive assembly 38 during operation of the vehicle. The clutch assemblies 42 and 44 have the same construction and mode of operation. The clutch assemblies 42 and 44 are connected with a rotatable steering member or shaft 48 which is connected with the steering wheel 12 and steering gear assembly 14.

A torque sensor 52 is connected with the steering wheel 12 and the steering shaft 48. The torque sensor 52 senses the direction and torque differential between the steering wheel 12 and steerable vehicle wheels 16 and 18 during turning of the steerable vehicle wheels. The torque sensor may have many different known constructions. However, it is contemplated that the torque sensor may have the construction illustrated in U.S. Pat. No. 4,800,974, issued Jan. 31, 1989 and entitled "Electric Steering Gear".

In the illustrated embodiment of the invention, a speed sensor 54 is connected with a vehicle transmission (not shown). The speed sensor 54 senses the forward speed of movement of the vehicle. It is contemplated that the speed sensor 54 may have any one of many different known constructions and may be connected with a portion of the vehicle other than the transmission.

An electronic control unit 56 controls operation of the clutch assemblies 42 and 44 as a function of the output of the torque sensor 52. In the illustrated embodiment of the invention, the electronic control unit 56 also controls the speed of operation of the continuously energized electric motor 28 as a function of the output of the speed sensor 54. The electronic control unit 56 may be of the type which includes microcomputer having an internal A/D converter to convert analog input signals to digital signals. The electronic control unit 56 has a driver circuit to provide an output of sufficient magnitude to control operation of the clutch assemblies 42 and 44. The electronic control unit 56 is supplied with power by the vehicle battery 30.

During operation of the vehicle, the electric motor 28 continuously drives the identical clutch assemblies 42 and 44 in opposite directions. Thus, the drive assembly 38 continuously transmits force from the output shaft 32 of the electric motor 28 to the clutch assemblies 42 and 44. However, until the torque sensor 52 registers a torque demand, possibly due to the driver of the vehicle rotating the steering wheel 12, the clutch assemblies 42 and 44 are ineffective to apply a net force to the steering shaft 48.

Prior to rotation of the steering wheel 12, the clutch assembly 42 is effective to apply a very small counterclockwise drive or drag force to the steering shaft 48. At this time, the clutch assembly 44 is also effective to apply a very small clockwise drive or drag force to the steering shaft 48. Since the drive forces applied to the steering shaft 48 by the clutch assemblies 42 and 44 prior to rotation of the steering wheel 12 are very small and are in opposite directions, the net drive forces acting on the steering shaft are zero and are not detectable by the driver of the vehicle.

When the driver of the vehicle rotates the steering wheel 12, the torque sensor 52 provides an output signal to the electronic control unit 56. The output signal from the torque sensor 52 to the electronic control unit 56 indicates the direction and torque differential between the steering wheel 12 and steerable vehicle wheels 16 and 18. In response to the output from the torque sensor 52, the electronic control unit 56 effects operation of one of the clutch assemblies 42 or 44 to transmit force from the drive assembly 38 to the steering shaft 48.

Upon operation of one of the clutch assemblies 42 or 44, an increased force is transmitted from the continuously energized electric motor 28 through the drive assembly 38 to the one clutch assembly. This results in the drive shaft 48 being rotated in either a clockwise or counterclockwise direction, depending upon which clutch assembly 42 or 44 which is operated, to rotate the pinion gear 22. Rotation of the pinion gear 22 moves the rack bar 24 axially to turn the steerable vehicle wheels 16 and 18.

If the driver rotates the steering wheel 12 in a counterclockwise direction, the output signal from the torque sensor 52 to the electronic control unit 56 has a magnitude and sign, for example positive, which is indicative of the direction and magnitude of the force applied to the steering wheel. The electronic control unit 56 effects operation of the clutch assembly 42 to transmit a force, which is a function of the output of the torque sensor 52, to the steering shaft 48. The force transmitted through the clutch assembly 42 assists in rotating the steering shaft 48 in a counterclockwise direction. The counterclockwise rotation of the steering shaft 48 results in the steerable vehicle wheels 16 and 18 being turned toward the left, as viewed in FIG. 1.

Similarly, if the driver rotates the steering wheel 12 in a clockwise direction, the output signal from the torque sensor 52 to the electronic control unit 56 has a magnitude and sign, for example negative, which is indicative of the direction and magnitude of the force applied to the steering wheel. The electronic control unit 56 effects operation of the clutch assembly 44 to transmit an increased force to the steering shaft 48 to rotate the steering shaft in a clockwise direction. The clockwise rotation of the steering shaft 48 results in the vehicle wheels 16 and 18 being turned toward the right, as viewed in FIG. 1.

During operation of the vehicle above a predetermined threshold speed, the speed sensor 54 and electronic control unit 56 cooperate to decrease the speed of operation of the continuously energized electric motor 28 as vehicle speed increases. Therefore, when then vehicle is stopped or travelling at a relatively slow speed, the electric motor 28 is continuously operated at a maximum speed. This maximum speed of operation of the electric motor 28 is maintained constant until the speed of the vehicle reaches the predetermined threshold speed.

Once the output signal from the speed sensor 54 indicates that the speed of the vehicle has exceed the predetermined threshold speed, the electronic control unit 56 decreases the speed of operation of the electric motor 28 as the speed of the vehicle increases. As the speed of the vehicle continues to increase, the speed of operation of the electric motor 28 is decreased until a predetermined minimum speed is reached. The continuously energized electric motor 28 is operated at the predetermined minimum speed during still further increases in the operating speed of the vehicle.

The direction of operation of the electric motor 28 is always the same. Thus, the output shaft 32 of the electric motor 28 is always rotated in the same direction, regardless of the direction of rotation of the steering wheel 12. Only the speed of operation of the electric motor 28 is varied with increasing vehicle speed to increase the operating efficiency of the steering assist apparatus 10. If desired, the motor 28 could be continuously operated at a constant speed. However, it is believed that it may be preferred to reduce the operating speed of the continuously energized electric motor 28 in order to reduce the energy consumption of the steering assist apparatus 10.

Drive Assembly

During operation of the vehicle, the drive assembly 38 is continuously driven in the same direction by the electric motor 28. The drive assembly 38 includes a gear box 60 connected with the motor output shaft 32. The gear box 60 has a pair of output shafts 62 and 64.

The output shaft 62 is continuously driven in a counterclockwise direction (as viewed in FIG. 1). The output shaft 64 is continuously driven in a clockwise direction (as viewed in FIG. 1). Since the electric motor 28 is continuously energized during operation of the vehicle, the output shafts 62 and 64 are continuously rotated in opposite directions during operation of the vehicle.

A pulley 66 connected with the output shaft 62 engages a drive belt 68 which transmits force from the pulley 66 to the clutch assembly 42. Similarly, a pulley 72 connected with the output shaft 64 engages a drive belt 74 which drives the clutch assembly 44. Since the drive shafts 62 and 64 are continuously driven in opposite directions during operation of the vehicle, the clutch assemblies 42 and 44 are continuously driven in opposite directions by the drive belts 68 and 74 during operation of the vehicle.

The speed at which the gear box output shafts 62 and 64 are driven by the electric motor 28 varies with variations in the operating speed of the electric motor. After the speed sensor 54 senses that the vehicle operating speed has exceeded a predetermined minimum or threshold speed, the operating speed of the electric motor 28 is reduced as vehicle speed increases until a minimum motor operating speed is reached. This results in the gear box output shafts 62 and 64 being driven at a speed which is reduced as vehicle speed increases above the threshold speed until the electric motor 28 is operating at its minimum speed. Of course, this results in a corresponding reduction in the speed at which the belts 68 and 74 are effective to drive the clutch assemblies 42 and 44.

The electric motor 28 is continuously energized at all times during operation of the vehicle. Therefore, the drive assembly 38 continuously drives the clutch assemblies 42 and 44 at all times during operation of the vehicle. However, the speed of operation of the electric motor 28 may decrease as vehicle speed increases above a threshold speed until a predetermined minimum operating speed for the electric motor 28 is reached.

In the illustrated embodiment of the invention, the drive assembly 38 includes a gear box 60 which continuously drives belts 68 and 74 connected with the clutch assemblies 42 and 44. It is contemplated that the drive assembly 38 could have a different construction if desired. For example, gear trains could be provided to transmit force from the electric motor 28 to the clutch assemblies 42 and 44 without the use of drive belts.

Clutch Assembly

The clutch assemblies 42 and 44 have the same construction and are activated one at a time by the electronic control unit 56 to accurately control the amount of force transmitted from the drive assembly 38 to the steering shaft 48 during rotation of the steering wheel 12. The clutch assembly 42 or 44 is activated by the electronic control unit 56 to transmit an amount of force which varies as a function of the amount of force applied to the steering wheel 12 by a driver of the vehicle. The amount of force transmitted by the clutch assembly 42 or 44 is infinitely variable through an operating range of the clutch assembly to enable the amount of force which is transmitted to the steering shaft 48 to be accurately controlled with variations in the amount of force applied to the steering wheel 12.

It is contemplated that the identical clutch assemblies 42 and 44 may have many different constructions. However, in the illustrated embodiment of the invention, the clutch assembly 42 includes a circular input member 80 (FIGS. 2 and 3) having a grooved drive section 82 which is engaged by the drive belt 68 (FIG. 1). The input member 80 is rotatably supported on the steering shaft 48 by bearing assemblies 84 and 86 (FIG. 3). The bearing assemblies 84 and 86 allow the input member 80 and steering shaft 48 to be freely rotated relative to each other.

The clutch assembly 42 also includes an output member 90 which is fixedly connected with the steering shaft 48. The output member 90 is enclosed by the input member 80 and is disposed in a chamber 92 in the input member 80. The output member 92 is spaced from the input member 80 throughout the extent of the output member. Suitable annular seals 94 are provided between the input and output members 80 and 90 to seal the chamber 92 while enabling the input and output members 80 and 90 to freely rotate relative to each other.

A body 98 of rheological fluid is disposed in the chamber 92 between the input member 80 and output member 90. The body 98 of rheological fluid completely fills the chamber 92 and is disposed between the input member 80 and output member 90. The output member 90 is disposed in sliding engagement with only the annular seals 94 and does not engage the input member 80.

The body 98 of rheological fluid is responsive to an energy field. Thus, increasing the strength of an energy field to which the body 98 of rheological fluid is exposed is effective to increase the shear strength of the rheological fluid. Increasing the shear strength of the rheological fluid in the body 98 of rheological fluid is effective to increase the force which is transmitted between the input member 80 and output member 90 during operation of the vehicle.

During operation of the vehicle, the input member 80 is continuously rotated by the drive assembly 38. Prior to exposure of the body 98 of rheological fluid to an energy field, the input member 80 is freely rotatable relative to the output member 90. Upon exposure of the body 98 of rheological fluid to an energy field, the shear strength of the rheological fluid increases as a direct function of the strength of the energy field. Increasing the shear strength of the rheological fluid in the body 98 of rheological fluid is effective to increase the force which is transmitted through the body of rheological fluid to the output member 90. This retards relative rotation between the input member 80 and output member 90.

It is contemplated that the rheological fluid in the body 98 of rheological fluid could respond to many different types of energy fields and have a composition which would depend upon the particular type of energy field to which the rheological fluid responds. In the embodiment of the invention illustrated in FIG. 3, the body 98 of rheological fluid responds to a magnetic field. In this specific instance, the rheological fluid in the body 98 of rheological fluid includes a vehicle, magnetizable particles suspended in the vehicle, and a dispersant.

The magnetizable particles may be any suitable magnetizable material such as iron, nickel, cobalt, etc. A preferred magnetizable particulate is insulated reduced carbonyl iron having an average particle size of from 0.1–10 microns.

The dispersant may be particles made of many different materials like single element metals or non-metal substances such as carbon, boron, aluminum, non-magnetizable iron, germanium and silicone. The dispersant may be inorganic compounds like metal carbides, oxide, nitride, and other salts of aluminum, boron, germanium, hafnium, iron, silicon, tantalum, etc. Organic compounds and polymers such as phenolics, epoxies, and polyimides may also be used to make dispersants as well as polymer-ceramic hybrid type materials like silica-siloxane polymer materials.

The vehicle may be an oil having a viscosity at 100° F. of between one and 1,000 centipoises. The vehicle may be Conoco LVT oil, kerosene, light paraffin oil, mineral oil, and/or silicone oil.

When the dispersant particles are mixed in the liquid vehicle, in a dispersing amount, they coat the magnetizable particles. The dispersing amount is that volume percent, based on the volume of magnetizable particles, effective to provide a thin coating of dispersant particles on each magnetizable particle. The coating preferably has a thickness no greater than a few layers of dispersant particles. Rheological fluids having this composition are disclosed in U.S. Pat. No. 5,354,488 issued Oct. 11, 1994 and entitled "Fluid Responsive to a Magnetic Field".

In the embodiment of the invention illustrated in FIG. 3, the body 98 of rheological fluid is responsive to a magnetic field. However, it is contemplated that the body 98 of rheological fluid could have a composition such that it would respond to a different type of energy field. For example, the body 98 of rheological fluid could be responsive to an electric field. An energy field generator 102 is disposed adjacent to the input member 98. The energy field generator 102 is stationary, that is, the energy field generator does not rotate with the input member 80. The energy field generator 102 is energizable to produce a variable strength energy field. The energy field is effective to increase the resistance of the body 98 of rheological fluid to shear as the strength of the energy field increases.

When the clutch 42 is to transmit a small force from the drive assembly 38 to the steering shaft 48 in response to rotation of the steering wheel with a small force, the energy field generator 102 is operable to provide a relatively weak energy field. This weak energy field is effective to increase the shear strength of the body 98 of rheological fluid by only a small amount. Therefore, the body 98 of rheological fluid is effective to transmit only a small amount of force from the input member 80 to the output member 90.

Upon rotation of the steering wheel 12 with a large force, the energy field generator 102 is activated by the electronic control unit 56 to provide a strong energy field. The strong energy field provided by the energy field generator 102 is effective to substantially increase the shear strength of the body 98 of rheological. This enables the body 98 of rheological fluid to transmit a relatively large force from the input member 80 to the output member 90.

Within the operating range of the energy field generator 102, the output of the energy field generator is infinitely variable. This enables the electronic control unit 56 to accurately vary the force transmitted by the clutch assembly 42 with very small variations in the force applied to the steering wheel 12.

In the specific embodiment of the invention illustrated in FIG. 3, the body 98 of rheological fluid is responsive to a magnetic field. Therefore, the energy field generator 102 is an electromagnet which is capable of generating a magnetic field. The electromagnet 102 has an annular configuration and is disposed within a toroidal chamber 104 formed between the continuously rotating input member 80 and an annular base 106. The base 106 is fixedly connected with a frame of the vehicle and does not rotate. Although the electromagnet 102 has a toroidal configuration, it is contemplated that the electromagnet 102 could be formed by a series of interconnected modular electromagnets having the same general construction as disclosed in the aforementioned U.S. Pat. No. 5,354,488 and mounted on the stationary base 106.

The input member 80 and base 106 are formed of a magnetizable material, but may contain nonmagnetizable sections. The output member 90 may be formed of a nonmagnetizable material or may be formed with sections of magnetizable material interspersed with sections nonmagnetizable material. It should be understood that the input and output members 80 and 90 and the base 106 could have a construction which is different than the specific construction disclosed herein.

In the illustrated embodiment of the invention, the clutch assemblies 42 and 44 contain rheological fluid which is responsive to a magnetic field. However, it is contemplated that the clutch assemblies 42 and 44 could contain fluids which are not rheological fluids. If this was done, suitable apparatus would be provided in place of the electromagnet 102 to control the amount of force transmitted between the input and output members 80 and 90.

Although only the construction of the clutch assembly 42 has been illustrated in FIGS. 2 and 3, it should be understood that the clutch assembly 44 has the same construction and the same mode of operation as the clutch assembly 42. Thus, the clutch assembly 44 includes input and output members having the same construction as the input and output members 80 and 90. The clutch assembly 44 also contains a body of rheological fluid, corresponding to the body 98 of rheological fluid. The clutch assembly 44 also has an electromagnet, corresponding to the electromagnet 102, to provide an energy field to which the body of rheological fluid is responsive. Of course, if desired, the construction of the clutch assemblies 42 and 44 could differ from the specific construction illustrated in FIGS. 2 and 3.

Operation

During operation of the vehicle, the electric motor 28 is continuously operating. Therefore, the drive assembly 38 is continuously driven by the motor output shaft 32. The continuously operating drive assembly 38 is effective to continuously rotate the input members 80 of the clutch assemblies 42 and 44 in opposite directions.

Prior to rotation of the steering wheel 12 by the driver of the vehicle, the electronic control unit 56 does not energize the electromagnets 102 in the clutch assemblies 42 and 44. Therefore, only relatively small viscous drag forces are transmitted from the input members 80 of the clutch assemblies 42 and 44 to the output members 90 of the clutch assemblies. Since the input members 80 of the clutch assemblies 42 and 44 are continuously rotated in opposite directions by the drive assembly 38, the relatively small viscous drag forces transmitted from the input members to the output members cancel each other and there is no net force on the steering shaft 48.

As the speed of the vehicle increases toward a predetermined threshold speed, the operating speed of the motor 28 remains constant at a predetermined maximum operating speed. Thus, the speed sensor 54 is effective to provide an output signal to the electronic control unit 56 indicating that the vehicle speed is less than a predetermined threshold speed. After the threshold speed has been achieved, as vehicle speed increases the operating speed of the motor 28 is reduced to conserve energy.

When the vehicle speed reaches a predetermined speed, the operating speed of the motor 28 will have been reduced to a minimum operating speed. Further increases in the vehicle speed will not result in the operating speed of the motor 28 being reduced past the predetermined minimum speed. Although it is preferred to reduce the operating speed of the motor 28 with increasing vehicle speed above a predetermined threshold, it is contemplated that it may be desired to maintain the operating speed of the motor 28 constant at all vehicle operating speeds.

In addition to reducing the operating speed of the motor 28 as vehicle speed increases, the electronic control unit 56 is effective to decrease the electrical current transmitted to the energy field generator 102. Thus, after the threshold speed has been achieved, as vehicle speed increases the strength of the energy field produced by the energy field generator 102 decreases. Similarly, as vehicle speed decreases, the electronic control unit 56 is effective to increase the electrical current transmitted to the energy field generator 102.

Upon turning of the steering wheel 12 by the driver of the vehicle, the electronic control unit 56 activates the electromagnet 102 in one of the clutches 42 or 44 to increase the shear strength of the rheological fluid in that clutch assembly and increase the force transmitted through the steering shaft 48 to the steering gear assembly 42 to assist in turning the steerable vehicle wheels 16 and 18. Thus, upon rotation of the steering wheel 12 in a counterclockwise direction, the torque sensor 52 provides an output to the electronic control unit 56. The output from the torque sensor 52 to the electronic control unit 56 indicates the direction and magnitude of the force applied to the steering wheel 12 by the driver of the vehicle.

In response to the output from the torque sensor 52 and from the speed sensor 54, the electronic control unit 56 energizes the electromagnet 102 in the clutch assembly 42. Energizing the electromagnet 102 in the clutch assembly 42 results in the electromagnet providing a magnetic field. The amount of current transmitted from the electronic control unit 56 to the electromagnet 102 to energize the electromagnet varies as a direct function of the torque applied to the steering wheel 12 by the driver of the vehicle and the output of the torque sensor 52. The amount of current transmitted from the electronic control unit 56 to the electromagnet 102 also varies as an indirect function of vehicle speed and the output of the speed sensor 54 at speeds above the threshold speed.

As the torque applied to the steering wheel 12 increases, the electronic control unit 56 is effective to increase the current which energizes the electromagnet 102 in the clutch assembly 42. Increasing the current which energizes the electromagnet 102 increases the strength of the magnetic field generated by the electromagnet. However, at vehicle speeds above the threshold speed, the electronic control unit 56 is effective to reduce the current which energizes the electromagnet 102 in the clutch assembly 42. Therefore, the current transmitted to the electromagnet 102 upon application of a specific amount of torque to the steering wheel 12 decreases as vehicle speed increases at speeds above the threshold speed.

Increasing the strength of the magnetic field generated by the electromagnet 102 effects the rheological fluid in the body 98 of rheological fluid. Thus, as the strength of the magnetic field increases, the shear strength of the rheological fluid in the body 98 of the rheological fluid increases. Increasing the shear strength of the body 98 of the rheological fluid results in an increase in the amount of force transmitted from the input member 80 to the output member 90.

As the force transmitted from the input member 80 to the output member 90 is increased, the counterclockwise force transmitted from the output member to the steering shaft 48 increases. Increasing the force transmitted to the steering shaft 48 increases the force which is transmitted from the steering shaft to the pinion gear 22. This increases the assistance provided by the apparatus 10 to turning of the steerable vehicle wheels 16 and 18 toward the left.

When the driver of the vehicle turns the steering wheel 12 in a clockwise direction, the output from the torque sensor 52 causes the electronic control unit 56 to energize the electromagnet 102 in the clutch assembly 44. At any one specific vehicle speed, the magnitude of the current provided by the electronic control unit 56 to energize the electromagnet 102 in the clutch assembly 44 will vary as a direct function of the torque applied to the steering wheel 12. Therefore, the strength of the magnetic field from the electromagnet 102 in the clutch assembly 44 will vary as a direct function of the force applied to the steering wheel by the driver of the vehicle.

At constant vehicle operating speed, as the torque applied to the steering wheel by the driver of the vehicle increases, the strength of the magnetic field will increase with a resulting increase in the shear strength of the body 98 of rheological fluid in the clutch assembly 44. This results in an increase in the force transmitted from the input member 80 to the output member 90 of the clutch assembly 44. Increasing the force transmitted from the input member 80 to the output member 90 of the clutch assembly 44 increases the clockwise force transmitted from the clutch assembly to the steering shaft 48. Increasing the force applied to the steering shaft 48 by the clutch assembly 44 increases the force transmitted to the steering assembly 14 to assist in turning the steerable vehicle wheels 16 and 18 toward the right as viewed in FIG. 1.

As vehicle operating speed increases above a threshold speed, the strength of the magnetic field will decrease with a resulting decrease in the shear strength of the body 98 of rheological fluid in the clutch assembly 44. This results in a decrease in the amount of force transmitted from the input member 80 to the output member 90 of the clutch assembly 44. Decreasing the amount of force transmitted from the input member 80 to the output member 90 of the clutch assembly 44 with increasing vehicle speed decreases the force transmitted from the clutch assembly to the steering shaft 48.

After the driver of the vehicle has turned the steering wheel 12 to turn the steerable vehicle wheels 16 and 18, the driver may either rotate the steering wheel in the opposite direction or merely release the steering wheel and allow forces applied to the steerable vehicle wheels by the road to turn the wheels back to a straight-ahead orientation. If the driver rotates the steering wheel 12 to return the steerable vehicle wheels 16 and 18 to the straight-ahead orientation, the force applied by the driver to the steering wheel will result in the electronic control unit 56 activating one of the two clutch assemblies 42 or 44 to assist in turning the steerable vehicle wheels.

However, if the drive merely releases the steering wheel and allows forces applied to the steerable vehicle wheels 16 and 18 by the road to operate the steering gear assembly 14, the inertia of the steering wheel 12 will oppose rotation of the steering shaft 48. This results in an output signal being transmitted by the torque sensor 52 to the electronic control unit 56. The electronic control unit 56 will then energize one of the two clutch assemblies 42 or 44 to assist the forces transmitted from the road to the steerable vehicle wheels in turning the steerable vehicle wheels toward a straight-ahead condition.

At this time, the forces transmitted through the energized clutch assembly 42 or 44 will be relatively small, compared to the forces which were originally transmitted through the other clutch assembly to originally turn the steerable vehicle wheels 16 and 18. Therefore, the load on the motor 28 will be reduced. It is contemplated that under certain driving conditions, the road forces may be so great as to drive the motor 28 back through the activated one of the two clutch assemblies 42 or 44 and the drive assembly 38.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in assisting in turning steerable vehicle wheels in either a first direction or a second direction in response to rotation of a steering member connected with a vehicle steering wheel during operation of a vehicle, said apparatus comprising:

first clutch means connected with the steering member for transmitting force to the steering member to assist in turning the steerable vehicle wheels in the first direction;

second clutch means connected with the steering member for transmitting force to the steering member to assist in turning the steerable vehicle wheels in the second direction;

an electric motor which is continuously energized during operation of the vehicle;

drive means connected with said continuously energized electric motor and with said first and second clutch means for transmitting force from said continuously energized electric motor to said first and second clutch means;

said first clutch means including a first input member which is driven by said drive means, a first output member which is connected with the steering member, a first body of rheological fluid which is responsive to an energy field, said first body of rheological fluid being at least partially disposed between said first input member and said first output member, and first field generating means which is energizeable to provide a first variable strength energy field which is effective to increase the resistance of said first body of rheological fluid to shear as the strength of the first energy field increases;

said second clutch means including a second input member which is driven by said drive means, a second output member which is connected with the steering member, a second body of rheological fluid which is responsive to an energy field, said second body of rheological fluid being at least partially disposed between said second input member and said second output member, and second field generating means which is energizeable to provide a second variable strength energy field which is effective to increase the resistance of said second body of rheological fluid to shear as the strength of the second energy field increases; and control means connected with said first and second field generating means for energizing said first field generating means to increase the resistance of the first body of rheological fluid to shear in response to rotation of the vehicle steering wheel to turn the steerable vehicle wheels in the first direction and for energizing said second field generating means to increase the resistance of the second body of rheological fluid to shear in response to rotation of the vehicle steering wheel to turn the steerable vehicle wheels in the second direction.

2. An apparatus as set forth in claim 1 wherein said first input member being rotatable at a first speed relative to said first output member prior to energization of said first field generating means, said first input member being rotatable relative to said first output member at a second speed which is less than the first speed upon energization of said first field generating means to provide a first energy field, said first input member being rotatable relative to said first output member at a third speed which is less than the second speed upon energization of said first field generating means to provide a second energy field which is stronger than the first energy field, said second input member being rotatable at a fourth speed relative to said second output member prior to energization of said second field generating means, said second input member being rotatable relative to said second output member at a fifth speed which is less than the fourth speed upon energization of said second field generating means to provide a third energy field, said second input member being rotatable relative to said second output member at a sixth speed which is less than the fifth speed upon energization of said second field generating means to provide a fourth energy field which is stronger than the third energy field.

3. An apparatus as set forth in claim 1 further including sensor means connected with said control means and the steering member for providing an output which varies as a function of variations in force applied to the steering wheel during rotation of the steering wheel to turn the steerable vehicle wheels, said control means being operable to energize said first field generating means to vary the strength of the first energy field as a function of the output from said sensor means during rotation of the steering wheel to turn the steerable vehicle wheels in the first direction, said control means being operable to energize said second field generating means to vary the strength of the second energy field as a function of the output from said sensor means during rotation of the steering wheel to turn the steerable vehicle wheels in the second direction.

4. An apparatus as set forth in claim 1 further including sensor means connected with said control means for providing an output which varies as a function of variations in vehicle speed during operation of the vehicle, said control means being operable to vary an operating speed of said electric motor as a function of vehicle speed during operation of the vehicle.

5. An apparatus as set forth in claim 1 further including sensor means connected with said control means for providing an output which varies as a function of variations in vehicle speed during operation of the vehicle, said control means being operable to energize said first field generating means to vary the strength of the first energy field as a function of the output from said sensor means during rotation of the steering wheel to turn the steerable vehicle wheels in the first direction, said control means being operable to energize said second field generating means to vary the strength of the second energy field as a function of the output from said sensor means during rotation of the steering wheel to turn the steerable vehicle wheels in the second direction.

6. An apparatus as set forth in claim 1 further including first sensor means connected with said control means and the steering member for providing an output which varies as a function of variations in force applied to the steering wheel during rotation of the steering wheel to turn steerable vehicle wheels and second sensor means connected with said control means for providing an output which varies as a function of variations in vehicle speed during operation of the vehicle, said control means being operable to energize said first field generating means to increase the strength of the first energy field as the output from said first sensor means indicates the application of increasing force to the steering wheel and to decrease the strength of the first energy field as the output from said second sensor means indicates increasing vehicle speed during rotation of the steering wheel to turn the steerable vehicle wheels in the first direction, said control means being operable to energize said second field generating means to increase the strength of the second energy field as the output from said second sensor means indicates the application of increasing force to the steering wheel and to decrease the strength of the second energy field as the output from said second sensor means indicates increasing vehicle speed during rotation of the steering wheel to turn the steerable vehicle wheels in the second direction.

7. An apparatus for use in assisting in turning steerable vehicle wheels in either a first direction or a second direction in response to rotation of a steering member connected with a steering wheel, said apparatus comprising:

first sensor means for providing an output which varies as a function of vehicle speed during operation of the vehicle;

second sensor means for providing an output which varies as a function of force applied to the steering wheel during rotation of the steering wheel to turn steerable vehicle wheels;

a variable speed electric motor which is continuously energized during operation of the vehicle;

first clutch means connected with the steering member for transmitting force to the steering member to assist in turning the steerable vehicle wheels in the first direction;

drive means connected with said continuously energized electric motor and with said first and second clutch means for transmitting force from said continuously energized electric motor to said first and second clutch means;

said first clutch means including a first input member which is driven by said drive means, a first output member which is connected with the steering member, and first clutch control means which is operable to vary the amount of force transmitted between said first input member and said first output member;

said second clutch means including a second input member which is driven by said drive means, a second output member which is connected with the steering member, and second clutch control means which is operable to vary the amount of force transmitted between said second input member and said second output member; and main control means connected with said variable speed electric motor and with said first sensor means for varying the speed of operation of said variable speed motor as a function of variations in the output of said first sensor means, said main control means being connected with said second sensor means and said first and second clutch control means to effect operation of said first clutch control means to vary the force transmitted from said first input member to said first output member as a function of variations in the output of said second sensor means during turning of the steerable vehicle wheels in the first direction and to effect operation of said second clutch control means to vary the force transmitted from said first input member to said first output member as a function of variations in the output of said second sensor means during turning of the steerable vehicle wheels in the second direction.

8. An apparatus as set forth in claim 7 wherein said first clutch means includes a first body of rheological fluid which is responsive to an energy field, said first body of rheological fluid being at least partially disposed between said first input member and said first output member, said first clutch control means including first field generating means which is energizeable to provide a first variable strength energy field which is effective to increase the resistance of said first body of rheological fluid to shear as the strength of the first energy field increases, said second clutch means includes a second body of rheological fluid which is responsive to an energy field, said second body of rheological fluid being at least partially disposed between said second input member and said second output member, said second clutch control means including second field generating means which is energizeable to provide a second variable strength energy field which is effective to increase the resistance of said second body of rheological fluid to shear as the strength of the second energy field increases, said main control means being responsive to said second sensor means to vary the strength of said first energy field as a function of variations in force applied to the steering wheel during turning of the steerable vehicle wheels in the first direction and to vary the strength of said second energy field as a function of variations in force applied to the steering wheel during turning of the steerable vehicle wheels in the second direction.

9. An apparatus for use in assisting in turning steerable vehicle wheels in either a first direction or a second direction in response to rotation of a steering member connected with a steering wheel, said apparatus comprising:

a variable speed electric motor which is continuously energized during operation of the vehicle;

first clutch means connected with the steering member for transmitting force to the steering member to rotate the steering member in one direction to assist in turning the steerable vehicle wheels in the first direction;

second clutch means connected with the steering member for transmitting force to the steering member to rotate the steering member in another direction opposite to the one direction to assist in turning the steerable vehicle wheels in the second direction;

drive means connected with said variable speed electric motor and said first and second clutch means for continuously transmitting force from said variable speed electric motor to said first and second clutch means during operation of the vehicle; and control means for varying the speed of operation of said variable speed electric motor as a function of variations in vehicle speed during operation of the vehicle.

10. An apparatus as set forth in claim 9 wherein said first clutch means includes a first input member which is continuously rotated in the one direction by said drive means at a speed which varies as a function of vehicle speed during operation of the vehicle, a first output member which is connected with the steering member, a first body of fluid at least partially disposed between said first input member and said first output member, said first body of fluid being continuously effective to transmit force from said first input member to said first output member to continuously urge said steering member to rotate in the one direction during operation of the vehicle, said second clutch means including a second input member which is continuously rotated in the other direction opposite to the one direction by said drive means at a speed which varies as a function of vehicle speed during operation of the vehicle, a second output member which is connected with the steering member, a second body of fluid at least partially disposed between said second input member and said second output member, said second body of fluid being continuously effective to transmit force from said second input member to said second output member to continuously urge said steering member to rotate in the other direction opposite to the one direction during operation of the vehicle, said control means being operable to increase the amount of force which is transmitted by said first body of fluid from said first input member to said first output member in response to rotation of the steering wheel in the one direction during operation of the vehicle, said control means being operable to increase the amount of force which is transmitted by said second body of fluid from said second input member to said second output member in response to rotation of the steering wheel in the other direction opposite to the one direction during operation of the vehicle.

11. An apparatus as set forth in claim 10 wherein said first body of fluid is a body of rheological fluid which is responsive to an energy field, said first clutch means including first field generating means which is energizeable by said control means to increase the amount of force which is transmitted by said first body of fluid from said first input member to said first output member, said second body of fluid being a body of rheological fluid which is responsive to an energy field, said second clutch means including second field generating means which is energizeable by said control means to increase the amount of force which is transmitted by said second body of fluid from said second input member to said second output member.

12. An apparatus for use in assisting in turning of steerable vehicle wheels in either a first direction or a second direction in response to rotation of a steering member connected with a steering wheel, said apparatus comprising:

an electric motor which is continuously energized during operation of the vehicle;

first clutch means connected with the steering member for transmitting force to the steering member to rotate the steering member in one direction to assist in turning the steerable vehicle wheels in the first direction, said first clutch means includes a first rotatable input member, a first output member which is connected with the steering member, and a first body of fluid which is at least partially disposed between said first input member and said first output member;

second clutch means connected with the steering member for transmitting force to the steering member to rotate the steering member in another direction which is opposite to the one direction to assist in turning the steerable vehicle wheels in the second direction, said second clutch means includes a second rotatable input member, a second output member which is connected with the steering member, and a second body of fluid which is at least partially disposed between said second input member and said second output member;

drive means connected with said electric motor and with said first and second input members for transmitting force from said electric motor to continuously rotate said first and second input members in opposite directions during operation of the vehicle;

control means for effecting operation of said first clutch means to transmit force from said first input member through said first body of fluid to said first output member in response to rotation of the vehicle steering wheel to turn the steerable vehicle wheels in the first direction and for effecting operation of said first clutch means to transmit force from said second input member through said second body of fluid to said second output member in response to rotation of the vehicle steering wheel to turn steerable vehicle wheels in the second direction; and said first body of fluid is a body of rheological fluid which is responsive to an energy field, said first clutch means including first field generating means which is energizeable by said control means to provide a first energy field which is effective to increase the resistance of said first body of rheological fluid to shear as strength of the first energy field increases, said second body of fluid being a body of rheological fluid which is responsive to an energy field, said second clutch means including second field generating means which is energizeable by said control means to provide a second energy field which is effective to increase the resistance of said second body of rheological fluid to shear as strength of the second energy field increases.

13. An apparatus for use in assisting in turning of steerable vehicle wheels in either a first direction or a second direction in response to rotation of a steering member connected with a steering wheel, said apparatus comprising:

an electric motor which is continuously energized during operation of the vehicle;

first clutch means connected with the steering member for transmitting force to the steering member to rotate the steering member in one direction to assist in turning the steerable vehicle wheels in the first direction, said first clutch means includes a first rotatable input member, a first output member which is connected with the steering member, and a first body of fluid which is at least partially disposed between said first input member and said first output member;

second clutch means connected with the steering member for transmitting force to the steering member to rotate the steering member in another direction which is opposite to the one direction to assist in turning the steerable vehicle wheels in the second direction, said second clutch means includes a second rotatable input member, a second output member which is connected with the steering member, and a second body of fluid which is at least partially disposed between said second input member and said second output member;

drive means connected with said electric motor and with said first and second input members for transmitting force from said electric motor to continuously rotate said first and second input members in opposite directions during operation of the vehicle;

control means for effecting operation of said first clutch means to transmit force from said first input member through said first body of fluid to said first output member in response to rotation of the vehicle steering wheel to turn the steerable vehicle wheels in the first direction and for effecting operation of said first clutch means to transmit force from said second input member through said second body of fluid to said second output member in response to rotation of the vehicle steering wheel to turn steerable vehicle wheels in the second direction; and sensor means connected with said control means for providing an output which varies as a function of vehicle speed during operation of the vehicle, said control means being effective to vary the speed of operation of said electric motor as a function of the output of said sensor means.

14. An apparatus for use in assisting in turning of steerable vehicle wheels in either a first direction or a second direction in response to rotation of a steering member connected with a steering wheel, said apparatus comprising:

an electric motor which is continuously energized during operation of the vehicle;

first clutch means connected with the steering member for transmitting force to the steering member to rotate the steering member in one direction to assist in turning the steerable vehicle wheels in the first direction, said first clutch means includes a first rotatable input member, a first output member which is connected with the steering member, and a first body of fluid which is at least partially disposed between said first input member and said first output member;

second clutch means connected with the steering member for transmitting force to the steering member to rotate the steering member in another direction which is opposite to the one direction to assist in turning the steerable vehicle wheels in the second direction, said second clutch means includes a second rotatable input member, a second output member which is connected with the steering member, and a second body of fluid which is at least partially disposed between said second input member and said second output member;

drive means connected with said electric motor and with said first and second input members for transmitting force from said electric motor to continuously rotate said first and second input members in opposite directions during operation of the vehicle;

control means for effecting operation of said first clutch means to transmit force from said first input member through said first body of fluid to said first output member in response to rotation of the vehicle steering wheel to turn the steerable vehicle wheels in the first direction and for effecting operation of said first clutch means to transmit force from said second input member through said second body of fluid to said second output member in response to rotation of the vehicle steering wheel to turn steerable vehicle wheels in the second direction; and said apparatus further includes sensor means connected with said control means for providing an output which varies as a function of force applied to the steering wheel during rotation of the steering wheel to turn steerable vehicle wheels, said control means being operable to effect a variation in the amount of force transmitted from said first input member through said first body of fluid to said first output member as a function of variations in the output of said sensor means during turning of the steerable vehicle wheels in the first direction and to effect a variation in the amount of force transmitted from said second input member through said second body of fluid to said second output member as a function of variations in the output of said sensor means during turning of the steerable vehicle wheels in the second direction.

15. An apparatus for use in assisting in turning of steerable vehicle wheels in either a first direction or a second direction in response to rotation of a steering member connected with a steering wheel, said apparatus comprising:

an electric motor which is continuously energized during operation of the vehicle;

first clutch means connected with the steering member for transmitting force to the steering member to rotate the steering member in one direction to assist in turning the steerable vehicle wheels in the first direction, said first clutch means includes a first rotatable input member, a first output member which is connected with the steering member, and a first body of fluid which is at least partially disposed between said first input member and said first output member;

second clutch means connected with the steering member for transmitting force to the steering member to rotate the steering member in another direction which is opposite to the one direction to assist in turning the steerable vehicle wheels in the second direction, said second clutch means includes a second rotatable input member, a second output member which is connected with the steering member, and a second body of fluid which is at least partially disposed between said second input member and said second output member;

drive means connected with said electric motor and with said first and second input members for transmitting force from said electric motor to continuously rotate said first and second input members in opposite directions during operation of the vehicle;

control means for effecting operation of said first clutch means to transmit force from said first input member through said first body of fluid to said first output member in response to rotation of the vehicle steering wheel to turn the steerable vehicle wheels in the first direction and for effecting operation of said first clutch means to transmit force from said second input member through said second body of fluid to said second output member in response to rotation of the vehicle steering wheel to turn steerable vehicle wheels in the second direction; and sensor means connected with said control means for providing an output which varies as a function of vehicle speed during operation of the vehicle, said control means being operable to effect a variation in the amount of force transmitted from said first input member through said first body of fluid to said first output member as a function of variations in the output of said sensor means during turning of steerable vehicle wheels in the first direction and to effect a variation in the amount of force transmitted through said second body of fluid to said second output member as a function of variations in the output of said sensor means during turning of the steerable vehicle wheels in the second direction.

* * * * *